United States Patent [19]

Karchewski

[11] Patent Number: 5,158,145

[45] Date of Patent: Oct. 27, 1992

[54] CULTIVATOR

[76] Inventor: John Karchewski, 15 Laird Cres., Regina, Saskatchewan S4R 4N7, Canada

[21] Appl. No.: 737,996

[22] Filed: Jul. 30, 1991

[51] Int. Cl.$^5$ ............... A01B 21/04; A01B 23/00
[52] U.S. Cl. ................... 172/548; 172/551; 172/705; 172/456
[58] Field of Search ............ 172/456, 540, 548, 549, 172/550, 551, 543, 518, 544, 570, 705, 707

[56] References Cited

U.S. PATENT DOCUMENTS

| | | | |
|---|---|---|---|
| 2,188,644 | 1/1940 | Short | 172/349 |
| 2,614,375 | 10/1952 | Calkins | 172/543 |
| 2,749,827 | 6/1956 | Harfert | 172/459 |
| 3,091,297 | 5/1963 | Matteoli et al. | 172/96 |
| 3,306,371 | 2/1967 | Bush | 172/540 |
| 3,650,332 | 3/1972 | Dedoes | 172/572 |
| 3,880,241 | 4/1975 | Vincent | 172/456 |
| 3,990,521 | 11/1976 | Ankenman et al. | 172/456 |
| 4,056,148 | 11/1977 | Blair | 172/456 |
| 4,241,793 | 12/1980 | Watkins | 172/705 |
| 4,449,591 | 5/1984 | Brown et al. | 172/705 |
| 4,646,850 | 3/1987 | Brown et al. | 172/572 |
| 4,776,404 | 10/1988 | Rogers et al. | 172/551 |
| 4,930,580 | 6/1990 | Fuss et al. | 172/572 |
| 4,991,660 | 2/1991 | Horváth et al. | 172/540 |

FOREIGN PATENT DOCUMENTS 727464 12/1966 Italy .................... 172/540

OTHER PUBLICATIONS

Lilliston-Lehman, "Super Duty Rolling Cultivator" Brochure, 1979.

Primary Examiner—Randolph A. Reese
Assistant Examiner—Spencer Warnick
Attorney, Agent, or Firm—George A. Seaby

[57] ABSTRACT

A rotary harrow blade assembly for a cultivator of the type including a drawbar for attachment to a towing vehicle, a pair of swing booms pivotally connected to the outer ends of the drawbar, and a plurality of skeletal frames extending rearwardly from the drawbar and booms for carrying packers, the assembly including tracks mounted on the packer frames, an elongated wheel frame suspended from the tracks and being movable therealong for changing the angle of inclination of the wheel frame with respect to the longitudinal axes of the drawbar and booms, and a plurality of toothed wheels mounted in the frame.

4 Claims, 8 Drawing Sheets

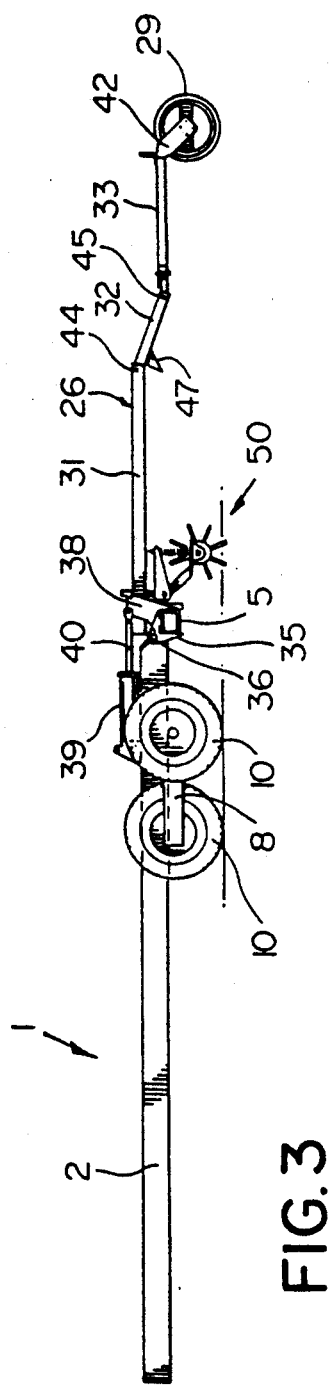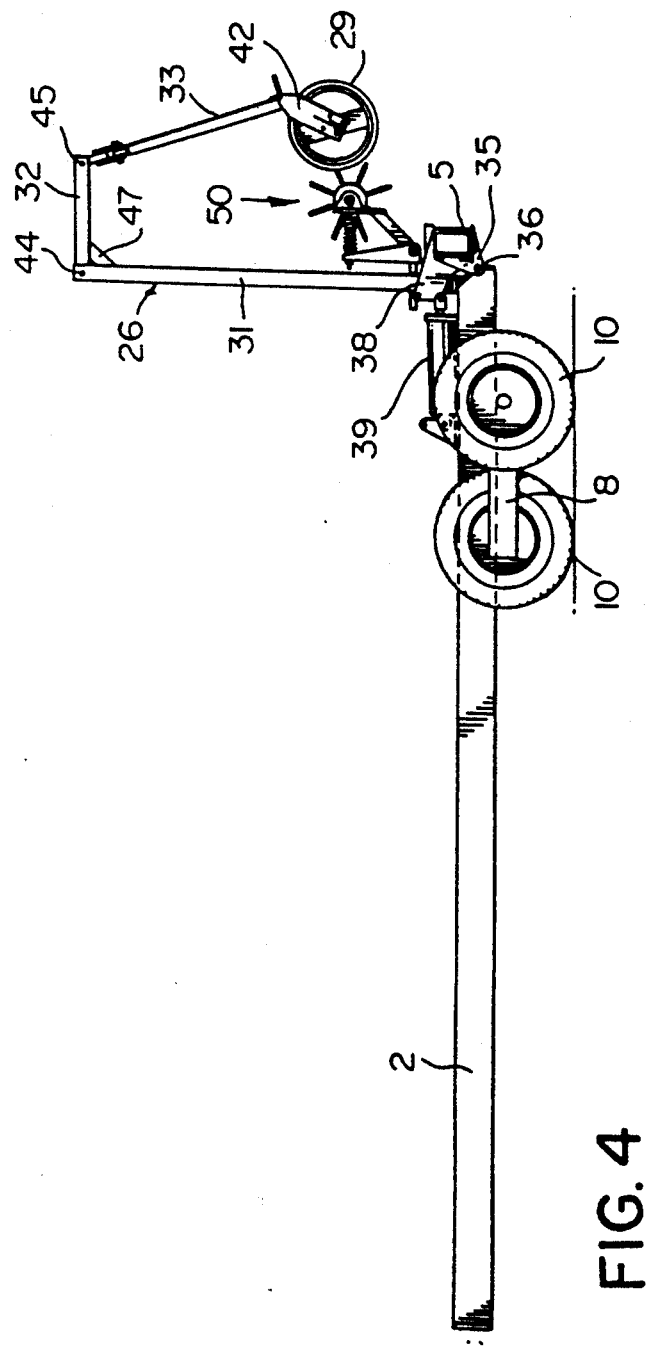
FIG.3
FIG.4

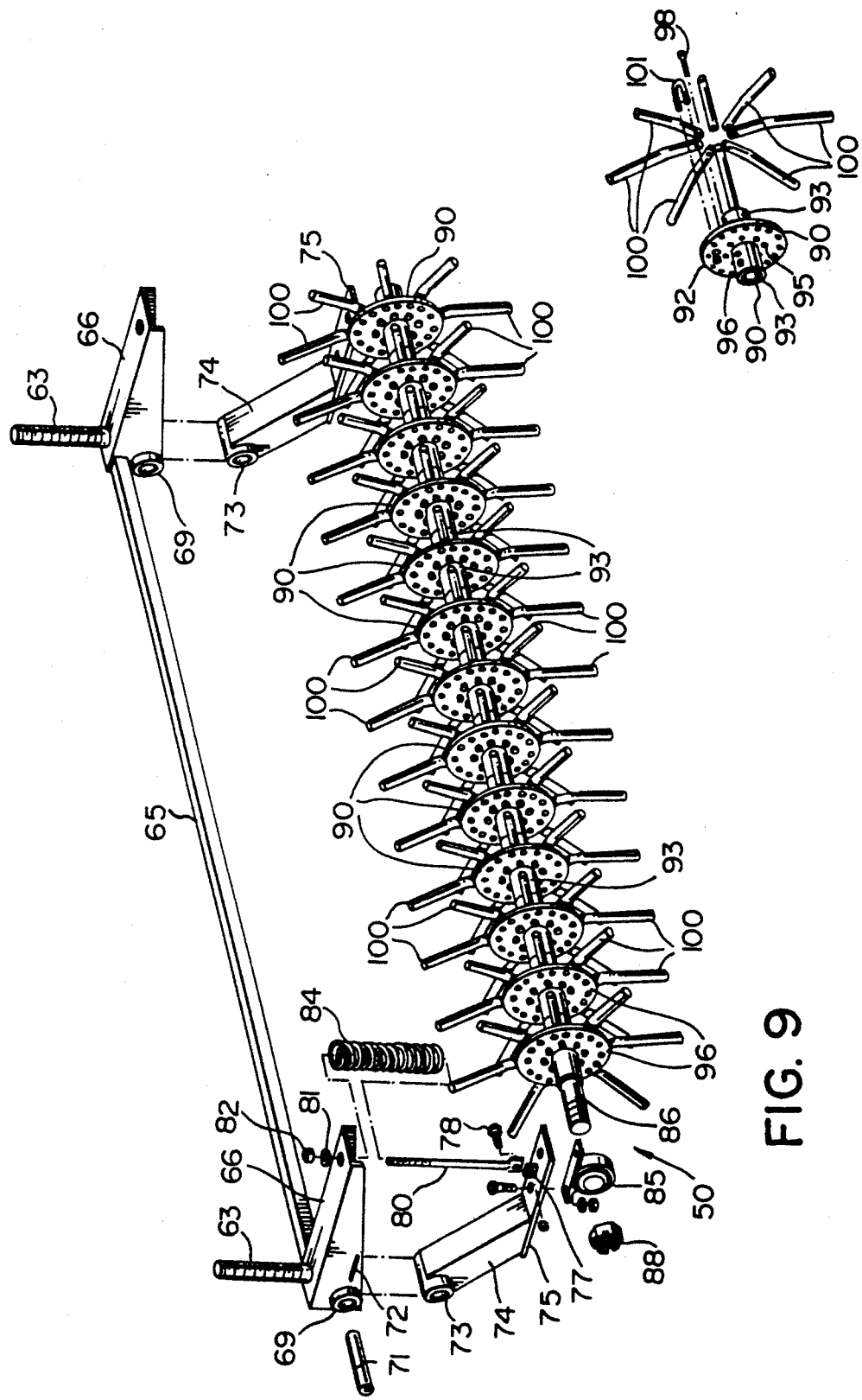

CULTIVATOR

BACKGROUND OF THE INVENTION

1. Field of the Invention

This invention relates to a cultivator, and in particular to a rotary blade assembly for a cultivator.

DISCUSSION OF THE PRIOR ART

Rotary cultivators and/or toothed wheels are disclosed, for example by U.S. Pat. No. 2,912,055, issued to C. Buddingh et al on Nov. 10, 1959; U.S. Pat. No. 3,010,526, issued to C. Van der Lely et al on Nov. 28, 1961; U.S. Pat. No. 3,314,486, issued to A. A. L. Remy on Apr. 18, 1967; U.S. Pat. No. 3,401,753, issued to P. A. Bezzerides et al on Sep. 17, 1968 and U.S. Pat. No. 4,114,697, issued to James L. Carlucci on Sep. 19, 1978. Other examples of prior art patents relating to cultivators or portions thereof (some of which have features in common with the invention described herein) includes U.S. Pat. No. 3,091,297, issued to A. J. Matteoli et al on May 28, 1963; U.S. Pat. No. 3,220,488, issued to K. Becker on Nov. 30, 1965 and U.S. Pat. No. 4,564,075, issued to C. J. Chekouras on Jan. 14, 1986.

When working with the cultivator described in the above-mentioned patent application, applicant found that there is still room for improvement in the field of rotary harrows. One of the market demands in the rotary harrow field is the ability to retrofit, i.e. to modify existing harrows or harrow/packer combinations to incorporate new technology.

An earlier cultivator designed by the inventor, includes wing booms angled with respect to the direction of travel of the cultivator. The wing booms are angled in order to effect the desired action of the rotating tines. A problem which arises with angled booms in that the forces generated by engagement of the ground by the tines cause the angled booms to rotate forward in the direction of travel. Such forward rotation of the booms results in slackening of the so-called draw cables. Thus, it is impossible to control the aggressiveness of the cut into the ground.

A second problem resides in the fact that existing harrows include a drawbar with a fixed central section. The retrofitting of existing harrow drawbar centre sections to utilize the teaching of the above-identified patent application would be extensive and thus expensive. Moreover, such modifications to existing units would require return of the units to the manufacturer.

Another problem is that cultivators of the type proposed by applicant often include packers, which are designed for use in parallel relationship to the wing booms carrying the harrow discs; i.e. the packers are designed for rotation around axes perpendicular to the direction of travel of the harrow. If the harrow boom angles are adjustable to produce the required tine action, packer spacing would have to be adjusted as well in order to cover the ground properly. Moreover, each packer is pulled by two separate arms. If the boom is angled, it would be necessary to use one longer arm. Otherwise, it would not be possible to pull the packer in a straight line parallel to the direction of cultivator travel.

The type of cultivators of concern to the inventor actually perform minor tillage. They stir up or mix the soil, and otherwise generally level the soil after a primary tilling machine has passed over the land. For example, the cultivator may travel behind an air seeder, smoothing the ground and leaving straw and weeds on the surface of the ground. It has been found that some such cultivators do not function well under heavy straw or trash conditions. For example, the cultivators may bury the straw which is undesirable. With conventional tine structures, the straw may be dragged forming clumps. The tines periodically trip, leaving clumps of straw at spaced apart locations in a field. Moreover, in general tine harrows do not work the ground as well as rotary harrows which, in some cases, necessitates more passes over the same ground to obtain the same results as a single pass using a rotary harrow.

GENERAL DESCRIPTION OF THE INVENTION

An object of the present invention is to address the above described problems in a positive manner by providing a relatively simple blade assembly for a cultivator, which can be used in combination with packers or other implements, and which efficiently cultivates to the desired depth without becoming clogged.

Another object of the invention is to provide a blade assembly, which can be used to retrofit existing machines.

Accordingly, the present invention relates to a cultivator comprising central drawbar means for attachment to a towing vehicle; wing boom means pivotally connected to the drawbar means for rotation between an extended use position aligned with the drawbar means and a trailing, transport position perpendicular to the drawbar means, and a main frame means carried by each said boom means extending rearwardly therefrom in the use position for towing a packer or other implement; rotary blade assembly means mounted on said main frame means, each said blade assembly means including elongated wheel frame means; harrow wheel means carried by said wheel frame means; and first bracket means for adjustable mounting said wheel frame means on the main frame, whereby said wheel means can be caused to rotate at a variety of acute angles with respect to the longitudinal axes of the drawbar means and boom means, the wheel means being inclined inwardly and forwardly on each side of the longitudinal center of the cultivator.

BRIEF DESCRIPTION OF THE DRAWINGS

The invention will be described in greater detail with reference to the accompanying drawings, which illustrate a preferred embodiment of the invention, and wherein;

FIG. 3 is a schematic side elevational view of the cultivator of FIG. 1, with parts omitted, showing a single harrow blade assembly and a packer in the use position;

FIG. 4 is a schematic side elevational view similar to FIG. 3, showing the harrow blade assembly and packer in the folded, transport position;

FIG. 9 is a schematic, isometric view of the wheel assembly of FIG. 8, with parts omitted;

FIG. 10 is a schematic, exploded, isometric view of a single toothed wheel or blade used in the assembly of FIGS. 8 and 9.

DESCRIPTION OF PREFERRED EMBODIMENT

Figure 1:
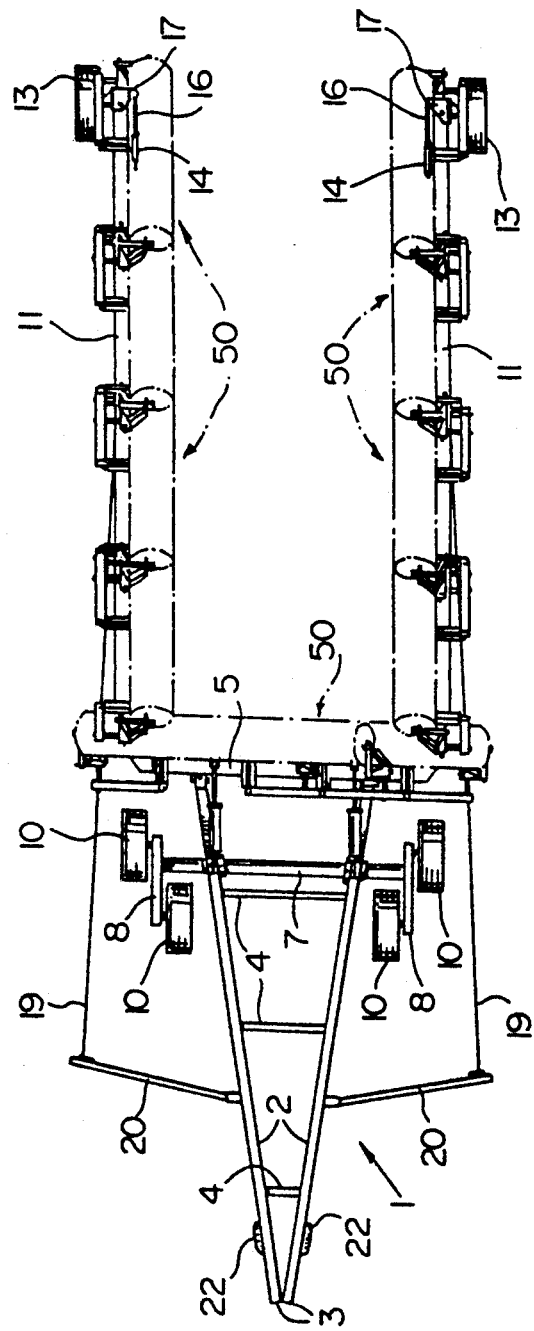
FIG. 1 is a schematic plan view of a cultivator incorporating a harrow wheel assembly in accordance with the present invention in the transport position.
Figure 2:
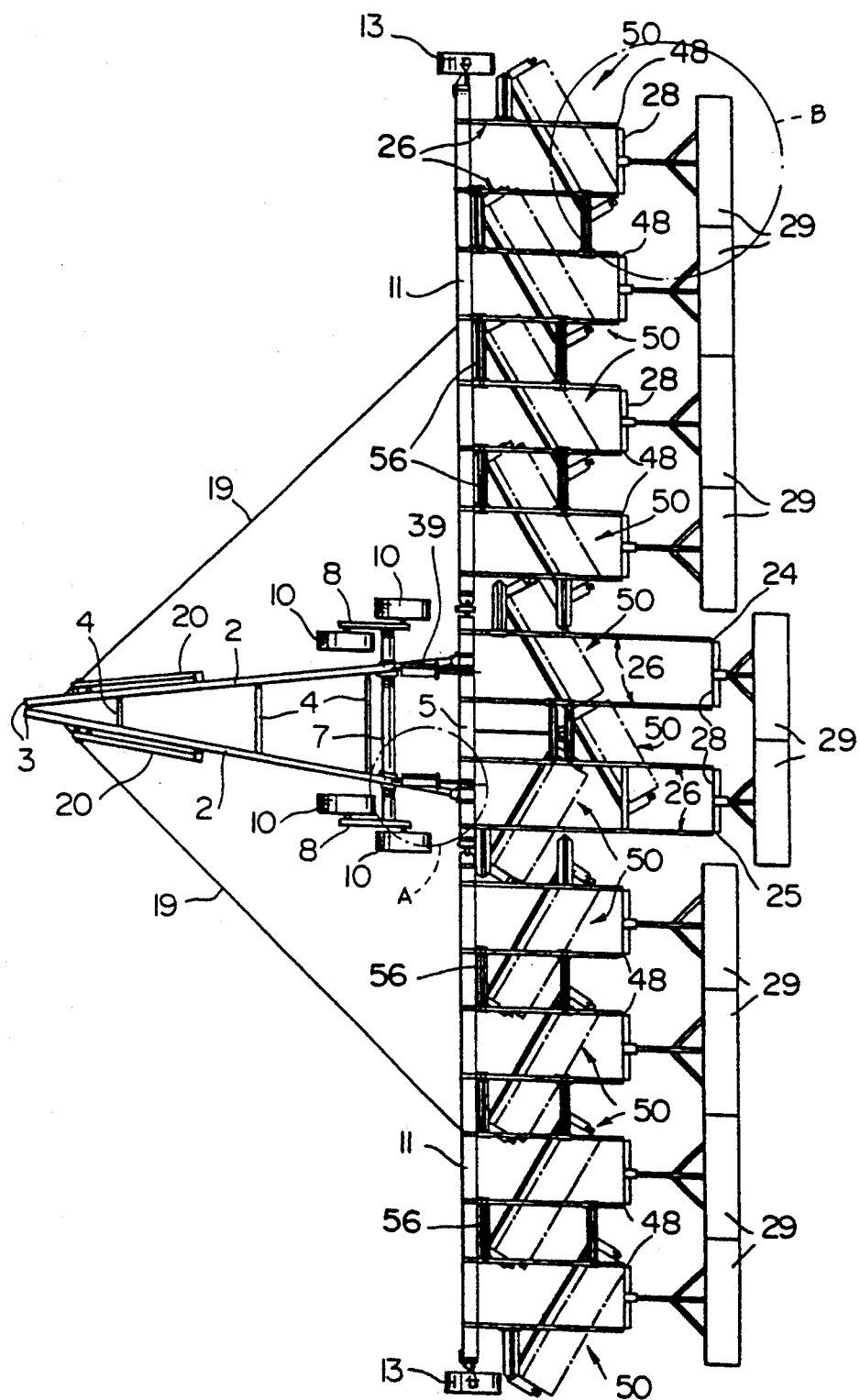
FIG. 2 is a schematic plan view of the cultivator of FIG. 1 in the use or field position with packers connected thereto.
Figure 5:
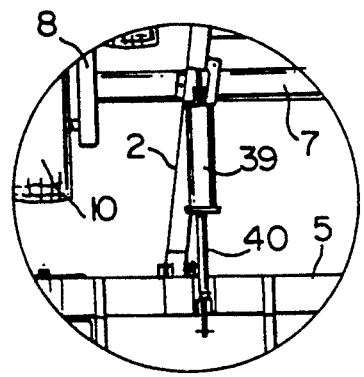
FIG. 5 is a plan view of the area of FIG. 2 surrounded by circle A on a larger scale.
Figure 6:
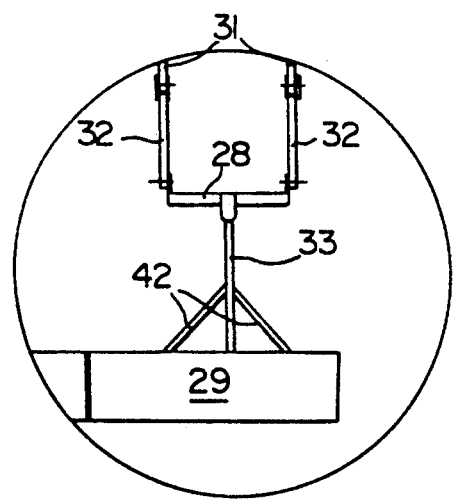
FIG. 6 is a plan view of the area of FIG. 2 surrounded by circle B on a larger scale.
Figure 7:
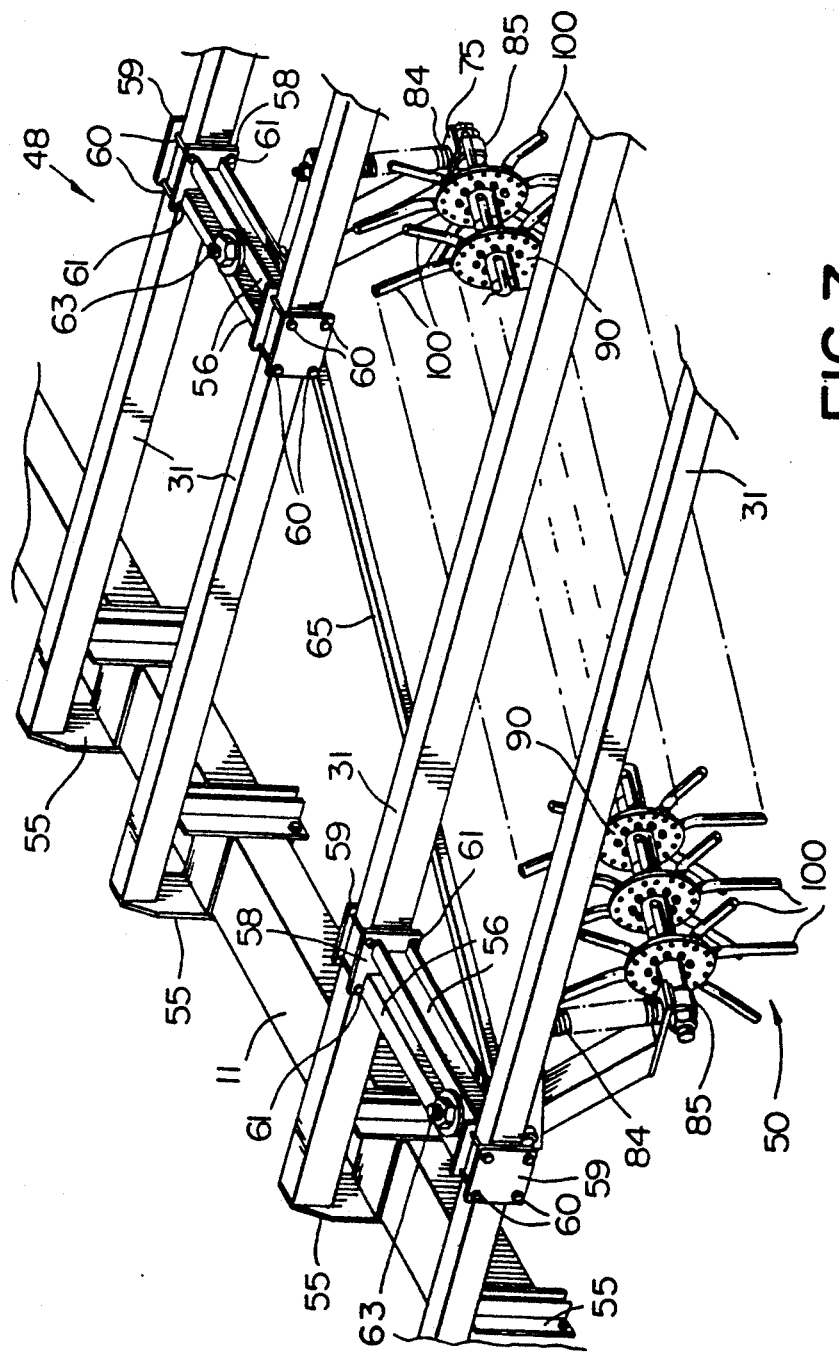
FIG. 7 is a schematic, isometric view of a length of cultivator boom and a wheel assembly used in the cultivator of FIGS. 1 and 2.

With reference to FIGS. 1 and 2, the cultivator incorporating the assembly of the present invention includes a trailer generally indicated at 1 for connecting the cultivator to a towing vehicle (not shown). The trailer 1 is defined by a pair of rearwardly flaring sides 2 interconnected at their front ends 3. A trailer hitch (not shown) is provided on the front ends of the sides 2 for connecting the cultivator to a tractor or other towing vehicle The sides are interconnected along their lengths by crossbars 4. A drawbar 5 is pivotally connected to the trailing ends of the sides 2 for rotation around a horizontal axis. The drawbar 5 extends beyond the trailing ends of the sides 2. An axle 7 is welded to the sides 2 near the rear end thereof. The axle 7 carries walking beams 8, which are rotatable around the longitudinal axis of the axle 7. Each walking beam 8 supports a pair of wheels 10. The use of walking beams 8 and two pairs of wheels 10 provides better support and trailer stability.

A swing boom 11 is pivotally connected to each end of the drawbar 5 for rotation around a vertical axis. A wheel 13 is provided on the outer free end of each boom 11. The wheel 13 is rotated from the transport position (FIG. 1) to the use position (FIG. 2) by hydraulic cylinders 14 mounted on the booms 11. Piston rods 16 extending out of the cylinders 14 are connected to triangular plates 17, which carry the axles of the wheels 13. The booms 11 are connected to the sides 2 of the trailer 1 by cables 19 extending rearwardly from the free ends of a pair of swing arms 20. The arms 20 are pivotally connected to the trailer sides 2 for rotation around vertical axes. The swing arms 20 are latched in the use position (FIG. 2) by a known latch mechanism (not shown).

The drawbar 5, which functions as a central boom carries a pair of elongated frames 24 and 25. The frames include sides 26 and rear crossbars 28, permitting towing of packer cylinders 29. Actually, the packer cylinders 29 are formed of square cross section shafts or bars, which are coiled to form a helix. As best shown in FIGS. 3 and 4, each frame side 26 includes an inner front arm 31, an intermediate section 32 and an outer or rear arm 33. The arm 31 is connected to the drawbar 5. The drawbar 5 is pivotally connected to the trailer sides 2 by a plate 35 and a pin 36. In the use position (FIG. 3), levers 38 (one shown) extend upwardly from the drawbar 5 for rotation by a hydraulic cylinder 39. When the piston rod 40 from the cylinder 39 to the lever 38 is extended, the frame sides 26 are in the use position (FIGS. 2 and 3). When the piston rod 40 is retracted, the arm 31, the lever 38 and the drawbar 5 pivot around the axis of the pins 36 to the vertical transport position (FIG. 4). The booms 11 follow the drawbar 5, i.e. rotate with the drawbar 5. The booms 11 can then be folded inwardly to the transport position (FIG. 1). In the use position, the front arms 31, the intermediate sections 32 and the rear arms 33, of the sides 26 are generally horizontal. The packers 29 are mounted on diagonal arms 42 and on the free ends of the rear arms 33. When the piston rod 40 is retracted, the arm 31 pivots upwardly to a vertical storage position, the intermediate section 32 rotates around a pin 44 to a horizontal position, and the rear arm 33 rotates around a pin 45 to an inclined position. Rotation of the section 32 around the axis of the pin 44 is limited by a triangular stop 47 on the inner end of such section 32. When the arm 31 has been rotated to the vertical position, the stop 47 abuts against such arm to hold the section 32 in the horizontal position.

Each of the central frames 24 and 25, and each of a plurality of similar skeletal, rectangular frames 48 on the booms 11 carries a toothed wheel assembly generally indicated at 50. The frames 48 are structurally similar to, but shorter than the frames 24 and 25, and are moved from the transport to the use position and vice versa in the same manner as the frames 24 and 25. The frames 48 include sides 26 connected to booms 11 by brackets 55. A crossbar 28 (FIG. 2) defining the outer end of each frame provides a support for an arm 33 extending rearwardly to a packer 29.

The frame sides 26 carry the blade or wheel assemblies 50. The wheel assemblies 50 are inclined, i.e. define an acute angle with respect to the longitudinal axes of the drawbar 5 and the booms 11 in the use position (FIG. 2). Moreover, the assemblies 50 overlap in the direction of travel, so that the whole area traversed by the drawbar 5 and the booms 11 is cultivated. Parallel, spaced apart crossbars 56 extend between the sides 26 of the adjacent frames. End plates 58 are provided on the ends of the crossbars 56. The plates 58 are connected to similar plates 59 on the other outer surface of each side 26 by bolts 60 and 61. The crossbars 56 define brackets for supporting threaded vertical bolts 63 of the wheel assemblies 50. As shown in FIG. 2, in the areas between the frames 24, 25 and 48, and at the outer sides of the outermost frames 48, the brackets defined by the crossbars 56 are cantilevered to one frame side 26 only. Otherwise, it would not be possible to separately hold the booms 11 rearwardly around vertical axes to the transport position (FIG. 1).

Figure 8:
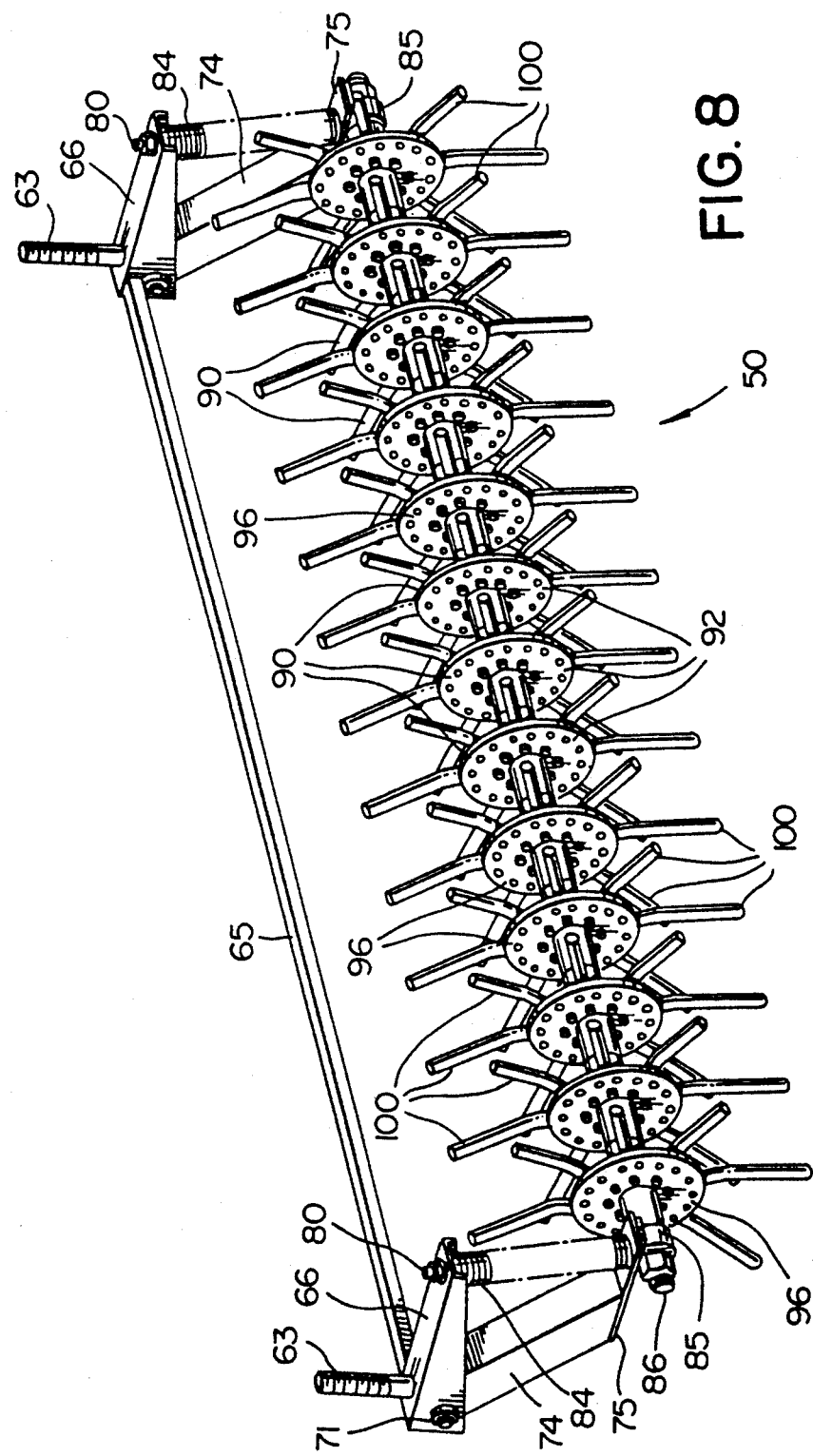
FIG. 8 is a schematic, isometric view of a wheel assembly used in the cultivator of FIGS. 1 and 2.

As best shown in FIGS. 8 and 9, each wheel assembly 50 includes a frame defined by a square cross section top bar 65, and generally triangular brackets 66 carrying the mounting bolts 63. The brackets 66 have an inverted U-shaped cross section, the bolts 63 extending upwardly from the front end thereof. Bearings 69 are provided in each side of each bracket 66 for receiving a shaft 71. The shaft 71 is retained in the bracket 66 by a pin 72, and pivotally supports a sleeve 73 (FIG. 9) on the top end of a rearwardly and downwardly inclined arm 74. A plate 75 extends rearwardly from the bottom end of each arm 74. A lug 77 extends upwardly from the plate 75 for receiving a bolt 78, which is used to connect the bottom end of a rod 80 to the plate. The top end of the rod 80 extends through the rear end of the bracket 66, and is threaded for receiving a washer 81 and a nut 82. A helical spring 84 is sandwiched between the plate 75 and the bracket 66 on the rod 80.

Pillow block bearings 85 are mounted on the bottoms of the plates 75 for rotatably supporting an elongated shaft 86. The ends of the shaft 86 are threaded for receiving retaining nuts 88. The shaft 86 supports a plurality of individual toothed wheels 90 (FIG. 10). Each wheel 90 is defined by a disc-shaped body 92 with a cylindrical hub 93 extending outwardly from each side thereof for receiving the shaft 86. Two spaced apart, circular rows of holes 95 and 96 are provided in the body 92, the inner row 95 receiving bolts 98 (FIG. 10), which also pass through the inner ends of radially extending teeth or tines 100. The outer holes 96 receive U-bolts 101 which pass around the tines 100 to securely retain the tines on the body 92. This structure enables quick and easy assembly and disassembly of both the wheel assembly 50 as a whole, and of the individual toothed wheels 90, e.g. for repair. The outer ends of the tines 100 are bent (by up to 20 degrees) around the outer periphery with respect to the longitudinal axes of the inner ends thereof.

With the toothed wheel structure described above, the individual wheels 90 are rotatable together on the shaft 86. In another embodiment of the invention (not shown) the shaft 86 is hexagonal in cross section throughout most of its length and the hubs 93 are likewise hexagonal for ensuring rotation of the wheels in unison. When a hexagonal shaft and hub are used, the wheels and tines can be offset with respect to each other, i.e. the tines 100 on one wheel are offset by 15~ with respect to the tines on each adjacent wheel.

Figure 11:
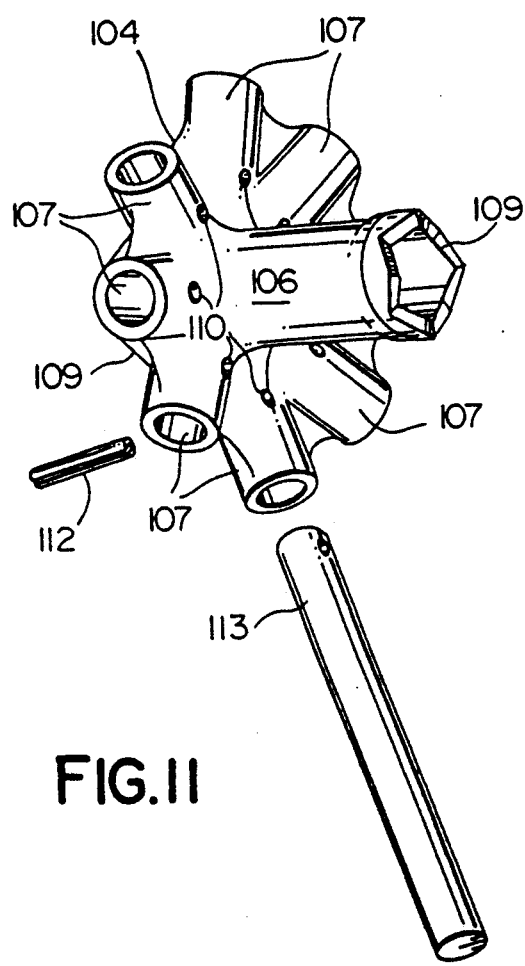
FIG. 11 is a schematic, exploded, isometric view (with parts omitted) of an alternate form of toothed blade for use in the assembly of FIGS. 8 and 9.

Referring to FIG. 11, another form of wheel 104 includes a one-piece tubular body defined by a central hub-defining tube 106 and a plurality of radially extending tine support tubes 107 integral with the tube 106. The tube 106 is mounted on the shaft 86. The ends 109 of the tube are serrated for latching adjacent wheels 104 together on the shaft 86. Aligned holes 110 in opposite sides of each tube 107 receive a pin 112 for retaining a straight tine 113 in the tube.

With the structure described above, the harrow wheel assembly 50 can be used to replace conventional harrows on existing frames. The angle of each harrow wheel assembly 50 with respect to the axes of the drawbar 5 and the booms 11 can be varied from approximately 25 to approximately 35 degrees. It is merely necessary to move the brackets defined by the plates 58 and 59 along the frame sides 26. Moreover, each assembly 50 is independent from each other assembly and can be angled independently. An important feature of the invention is that the wheels 90 or 104 on each side of the longitudinal center of the cultivator are inclined forwardly and inwardly, i.e. the leading end of each wheel in the direction of cultivator travel is closer to such longitudinal center than the trailing end of the wheel. Thus, the wheels on each side of the longitudinal center of the cultivator are inclined in opposite directions. With this arrangement, the forces generated by engagement of the ground by the tines 100 or 113 increases (rather than decreasing) the tension on the cables 19. Were it not for this fact, the rotary harrow proposed in this application could not be retrofitted to an existing harrow packer drawbar. The bolts 63 supporting the wheel assemblies 50 permit adjustment of the depth of cut and tilting of the assemblies for deeper cuts on one side than the other. The springs 84 and the rotatable arms 74 define trip mechanisms for each end of each assembly 50. By rotating the nuts 82, the tension on the springs 84, and thus the pressure required to trip the assemblies can be varied. On harder ground, the tension can be increased. The mounting of the bearings 85 outside of the wheels 90 reduces the likelihood of plugging of the unit, e.g. with straw. The use of bent tines 100 also helps to prevent plugging of the wheel assemblies. Finally, the tines 100 throw straw and dirt into the air. Because the dirt is heavier and settles first, the straw falls evenly onto the ground rather than becoming buried.

I claim:

1. A rotary blade assembly for use on a cultivator including drawbar means for attachment to a towing vehicle, and a main frame carried by said drawbar means extending rearwardly therefrom in a use position, said blade assembly comprising a pair of rearwardly extending bracket means, bolt means extending upwardly from a front end of each said bracket means for mounting the blade assembly on the main frame; elongated crossbar means extending between and interconnecting the front ends of said bracket means; arm means pivotally connected at an inner, top end to said front end of each said bracket means, said arm means extending rearwardly and downwardly from said front end in the use position of the assembly to support; shaft means extending between bottom, ear ends of each said arm means; a plurality of toothed wheel means in end-to-end relationship on said shaft means to rotatably cultivate the ground; rod means on said bottom, rear ends of each said arm means, said rod means extending upwardly through and slidably retained in the rear ends of said bracket means; spring means on said rod means between said bracket means and said arm means for biasing said bottom, rear end of each said arm means downwardly; and nut means on the top end of said rod means above said bracket means limiting downward movement of said bottom rear end of each said arm means; said rod means and said spring means permitting tripping of the assembly when the plurality of wheel means encounters an obstruction; and said bolt means, said rod means and said nut means permit changing of the angle of inclination of said shaft means and the depth of cut of said wheel means.

2. A blade assembly according to claim 1, wherein each said wheel means includes disc-shaped body means; tubular hub means extending outwardly from each side of said body means for rotatably mounting the wheel on said shaft means; and a plurality of individual tines extending radially outwardly from said body, each said tine including a straight inner section parallel to said body, and an outer section inclined with respect to the plane of said body for avoiding clogging of the wheel means during use.

3. A blade assembly according to claim 1, wherein each said wheel means includes tubular hub means for mounting on said shaft means; and a plurality of tubular holder means extending radially outwardly from said hub means; and rectilinear tine means for mounting in each said holder means.

4. A blade assembly according to claim 3, wherein said holder means are integral with said hub means, and each end of said hub means is serrate, whereby said toothed wheels rotate together on said shaft means.

* * * * *